May 25, 1965  R. S. HINSEY ETAL  3,184,992
MECHANISM CONTROL

Filed Feb. 1, 1960  4 Sheets-Sheet 1

INVENTORS:
ROBERT S. HINSEY,
BY CHARLES S. DAVIDSON.
Harry O. Ernsberger
ATTORNEY United States Patent Office 3,184,992
Patented May 25, 1965

3,184,992
MECHANISM CONTROL
Robert S. Hinsey, Toledo, Ohio, and Charles S. Davidson, La Salle, Mich., assignors, by mesne assignments, to Universal American Corporation, a corporation of Delaware
Filed Feb. 1, 1960, Ser. No. 5,959
6 Claims. (Cl. 74—534)

This invention relates to mechanism control and more particularly to apparatus for actuating or controlling the brake mechanism of vehicles and specifically the parking or emergency brakes of a vehicle.

Various types of brake actuating mechanism of the foot-operated character have been utilized for actuating the parking or emergency brakes of automotive vehicles. Such foot-operated types as have been used comprise a foot-operated lever associated with means connected with the lever whereby movement of the foot-operated lever effects a setting of the parking brakes, a detent means being employed for holding the lever in brake-setting position. Various forms of hand-operated and foot-operated release means have been proposed for releasing the detent means permitting the foot-operated lever to move to its initial or brake release position.

Recent trends in automotive vehicle design have been toward larger and heavier vehicles with a consequent result that increased braking force or pressure is deemed expedient or necessary for effectively setting or actuating the parking or emergency brakes of the vehicles. In present design of automotive vehicles, limited space in the operator's compartment is available for the parking brake actuating means and in order to secure the increased force for actuating the parking brakes it has been proposed to shorten the load arm of the lever thus increasing the lever multiplication necessary to transmit increased force in setting the brakes. With such increased lever multiplication greater distance of movement of the foot-operated actuating lever is required to set the parking brakes especially in instances where the brake shoes have become worn. In many instances this movement of the actuating lever is insufficient to effectively set the parking brake mechanism.

The present invention relates to an actuating and controlling means especially adaptable for controlling the parking brakes of a vehicle incorporating an arrangement for securing increased movement of the brake actuating means through the provision of a foot-operated brake actuating member adapted for successive movements to effectively set the parking or emergency brake mechanism of a vehicle.

The apparatus of the invention embraces the provision of a brake actuating component or means arranged to be actuated by movement of a foot-operated member mounted in a manner whereby successive operative strokes of the foot-operated member effects successive movements of the brake actuating component to effectively set the parking brakes of a vehicle irrespective of the condition of wear of the brake means.

Another object of the invention is the provision of a member swingably mounted with respect to the foot-operated actuating member cooperating with means carried by a brake actuating component or element whereby the brake mechanism is positively set or retained in any position of adjustment, the member being swingable to a release position whereby the brake actuating component and the foot-operated member are returned to initial or brake release position without liability of impairment of or damage to the retaining mechanism.

Another object of the invention resides in an actuating or controlling means for the parking brakes of a vehicle wherein a foot-operated lever member is adapted for successive strokes associated with means for transmitting the movements or strokes to a brake actuating element in conjunction with positively operating means for retaining the brake actuating element in any brake-setting position, the arrangement embodying hand-operated release means requiring a minimum amount of force to release the retaining means.

Another object of the invention is the provision of a mechanism for actuating or controlling the parking brakes of a vehicle wherein a brake actuating element, which is adaptable for movement relative to a foot-operated actuating means, is arranged to cumulate successive operative strokes of the actuating means to effectively set the brakes of a vehicle with a minimum of space required for the successive strokes or brake-setting movements of the foot-operated actuating means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

While the forms of mechanism control of the invention illustrated in the drawings are particularly adapted for actuating or controlling the emergency or parking brakes of a vehicle, it is to be understood that the invention may be utilized for controlling other forms of mechanism wherever the same may be found to have utility.

Figures 1, 5, 6, 7, 8:
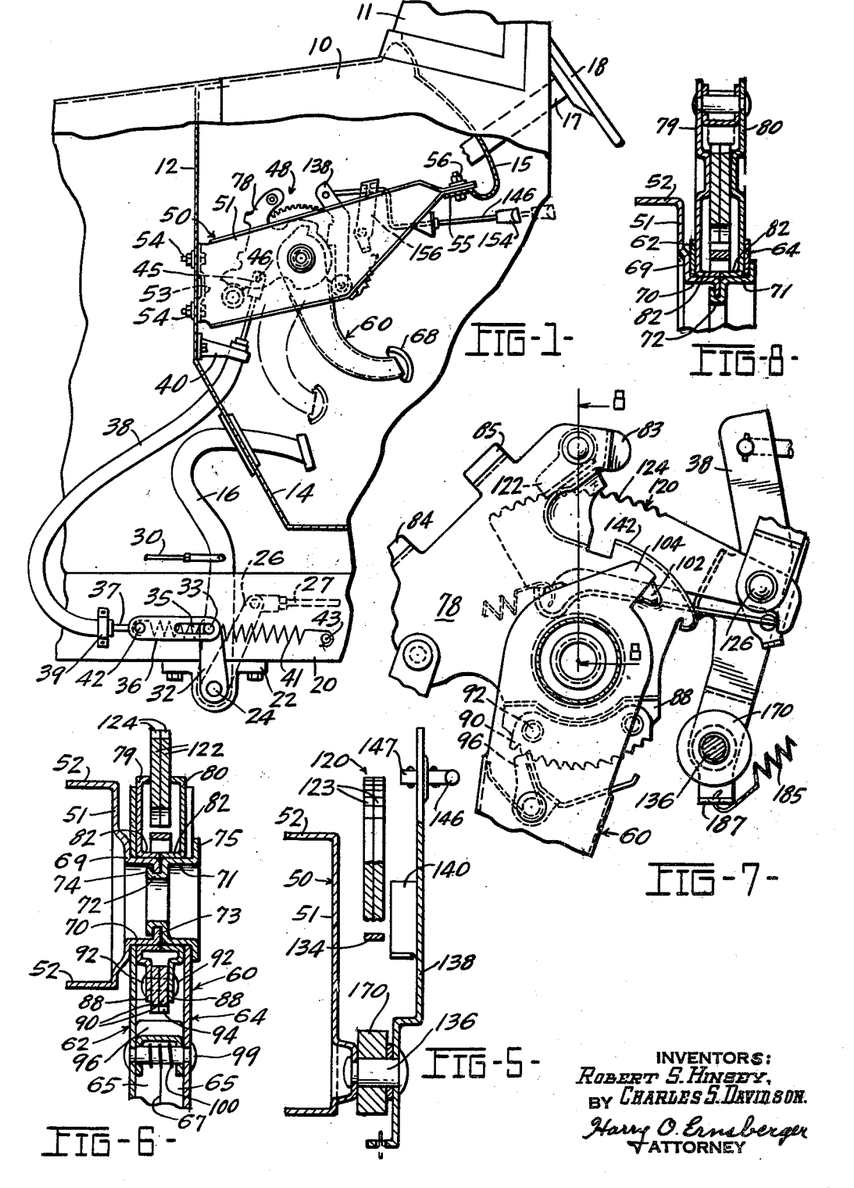
FIGURE 1 is an elevational view of a portion of the operator's compartment of an automotive vehicle, portions of the vehicle body being broken away illustrating one form of the brake actuating apparatus of the invention installed in the vehicle.
FIGURE 5 is a detail sectional view taken substantially on the line 5—5 of FIGURE 2.
FIGURE 6 is a detail sectional view taken substantially on the line 6—6 of FIGURE 2.
FIGURE 7 is a fragmentary elevational view of a portion of the mechanism shown in FIGURE 2 illustrating the relationship of components of the mechanism at the completion of an initial brake-setting stroke of a foot-operated lever means.
FIGURE 8 is a detail sectional view taken substantially on the line 8—8 of FIGURE 7.

Referring to the drawings in detail, there is illustrated in FIGURE 1 an installation of a form of the invention in the operator's compartment of a vehicle. The portion of the vehicle illustrated in FIGURE 1 is inclusive of a cowl section 10, a windshield 11, a dashboard or firewall 12, a toe board 14, an instrument panel 15, a service brake actuating pedal 16, a steering post 17 and a steering wheel 18.

The chassis of the vehicle supporting the above-mentioned components includes a frame construction embodying a pair of lengthwise extending, transversely spaced frame members 20, one of which is shown in FIGURE 1, which are joined by cross members (not shown). Secured to the frame members 20 are brackets 22, one of which is shown in FIGURE 1, the brackets journally supporting a transversely extending shaft 24. Fixedly mounted upon the shaft 24 is an upwardly extending arm 26 arranged to be connected by a rod 27, cable or other suitable means with parking brakes (not shown) associated with road wheels of the vehicle, the parking brakes being of conventional construction.

The service brake pedal 16 may also be journaled upon the shaft 24 and is connected with a rod 30 arranged to actuate conventional hydraulic brake-setting mechanism for controlling the service brakes of the vehicle. Also secured upon the shaft 24 is an upwardly extending arm 32, the distal end of the arm being provided with a pin or stub shaft 33 which is adapted for traverse in a slot 35 formed in a connecting link or member 36. A flexible cable 37 enclosed within a suitable sheath 38 is employed for connecting the brake actuating and controlling means of the invention with the link 36.

It is to be understood that means other than that disclosed may be employed for connecting the flexible cable 37 with the parking brakes. The lower end of the cable 37 is connected with the link 36. The end region of the sheath 38 adjacent the link 36 is secured to the frame member 20 by means of a clip 39, the upper end region of the sheath 38 being secured to a bracket 40 associated with the firewall 12.

The cable 37 and associated link 36 are biased toward brake releasing position by means of a contractile spring 41, one end of which is connected to a pin 42 carried by the link 36, the other end of the spring being anchored to the frame member 20 by a pin 43. The brake actuating and controlling mechanism is also biased toward brake release position by conventional brake shoe springs (not shown). The upper end of the brake actuating cable 37 is equipped with a clevis 45 which is connected by means of a pin 46 with a rotatable element of the foot-operated brake actuating mechanism 48 for controlling the parking or emergency brakes.

The brake actuating and controlling mechanism of the invention is mounted upon a suitable relatively stationary support or bracket means 50 fashioned with a generally planar body portion 51 bounded by flanges 52. One end of the bracket 50 is formed with a transversely extending flange 53 secured to the firewall 12 by means of bolts 54, the other end region of the bracket formed by the converging flanges 52 being secured to a flange 55 of the instrument panel by means of a bolt 56.

The mechanism control 48 of the invention is adapted to be foot-operated and includes a foot-operated lever or lever member 60 which is fulcrumed or journaled upon a support 50 and is associated with means connected with the brake actuating cable 37 and a retaining means for retaining the brakes in set position. The lever member 60 is fashioned of sheet metal and, in the embodiment illustrated is formed of two mating sections 62 and 64, each provided with laterally extending flanges 65 which are joined together by welding at a median line 67 as shown in FIGURE 6.

The lower extremities of the sections comprising the lever member 60 are welded or otherwise secured to a foot pad portion 68 as shown in FIGURE 1. The planar or web portion 51 of the bracket or support 50 is fashioned with a boss portion 69, shown in FIGURES 6 and 8, from which extends transversely a circular sleeve portion or flange 70. A sleeve-like bushing 71 of the same exterior diameter as the circular sleeve or flange 70 is aligned therewith as shown in FIGURE 6, the sleeve-like portions 70 and 71 forming a journal upon which the lever member 60 is fulcrumed.

After assembly of the lever sections and other components on the sleeve 70 shown in FIGURE 6, the bushing or sleeve-like member 71 is assembled with the sleeve-like member 70, the bushing 71 having a tenon portion 72 extending through an opening defined by a circular flange 73 on the sleeve 70, and the end region of the portion 72 swaged as shown at 74 over the circular flange 73 to secure the sleeve 71 to the sleeve 70. The sleeve 71 is provided with an outwardly extending flange 75 to prevent transverse dislodgment of the lever 60.

Also journally supported upon the sleeve portions 70 and 71 and disposed between the webs or walls of the lever sections 62 and 64 is a rotatable element or component 78 preferably fashioned of two mating sections 79 and 80 as shown in FIGURES 6 and 8. The sections 79 and 80 are formed with circular flange portions 82 of a diameter to be rotatably supported upon the sleeve portions 70 and 71. The sections 79 and 80 are provided with mating ear portions 83, 84 and 85 which are welded together as at 86.

As the clevis 45 connected with the brake actuating cable 37 is pivotally connected with the member 78 by means of the pin 46, clockwise rotatable movement of member 78 about the axis of the journal provided by the sleeves 70 and 71 is operable to set the parking or emergency brakes of the vehicle. The sections 79 and 80 of the element 78 are respectively provided with flange portions 88 shown in FIGURE 6 and positioned between the flanges 88 is a pair of toothed members or ratchet sector means 90 which are of identical shape and are secured to the flanges 88 by means of rivets 92.

The members 90 are provided with teeth 94 which are adapted for cooperation with a pawl or pawl member 96 carried by the lever or actuating member 60, the teeth 94 of members 90 being generated in an arc about the fulcrum of the lever viz. the axis of the sleeve portions 70 and 71. The pawl member 96 is adapted for cooperative engagement with the teeth 94. The pawl member 96 is pivotally supported intermediate the sections 62 and 64 of the lever upon a rivet 99 extending through openings in the lever sections 62 and 64 and through openings in the leg portions of the U-shaped pawl member 96 as shown in FIGURE 6.

Figures 2, 4:
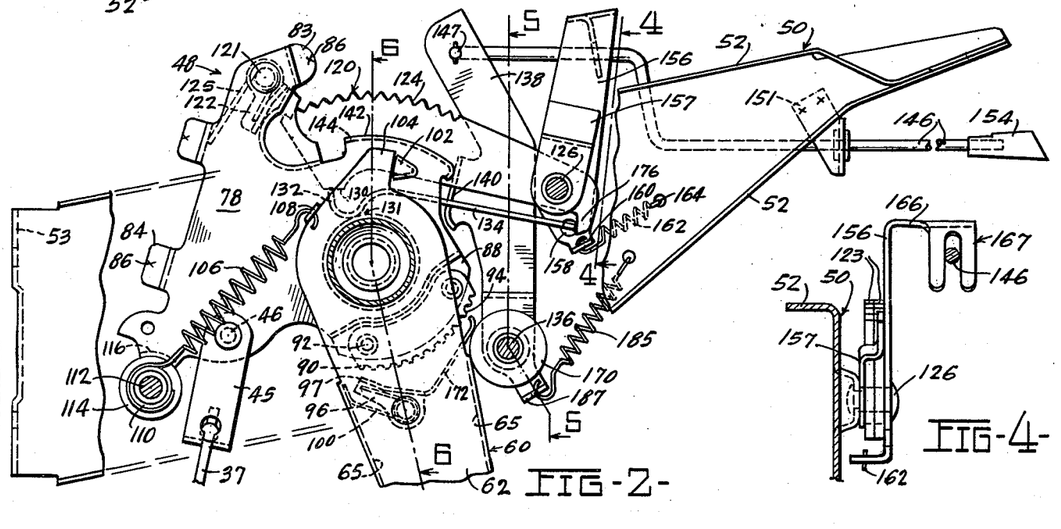
FIGURE 2 is an enlarged elevational view of a portion of the parking brake actuating mechanism illustrated in FIGURE 1, portions of the mounting means being broken away for purposes of illustration.
FIGURE 4 is a detail sectional view taken substantially on the line 4—4 of FIGURE 2.

As shown in FIGURES 2 and 6, a spring 100 has a coiled portion surrounding the rivet 99 and leg portions respectively engaging the pawl 96 and a flange of one of the lever sections to normally bias the pawl 96 into engagement with the teeth 94 of the ratchet means 90. The pawl member 96 and ratchet member 90 cooperate in a manner hereinafter explained for effecting movement of the rotatable brake actuating component or element 78.

Means is provided establishing operative engagement between the lever member 60 and the rotatable brake actuating member 78 for moving the latter upon swinging movement of the lever member 60. As particularly shown in FIGURES 2, 3 and 10, the walls of the sections 79 and 80 forming the element 78 are fashioned with outwardly struck projections or abutments 102 which are disposed in the paths of abutments or projections 104 formed as extensions of the web portions of the lever sections 62 and 64. As shown in FIGURE 2, the projections 104 of the lever construction 60 are engaged with the struck up portions 102 on the member 78 when the lever member and associated components are in initial or brake release position.

The foot-operated member 60 is normally biased toward normal or rearmost position of movement under the influence of a contractile spring 106. One end of the contractile spring 106 engages in an opening formed in a transversely extending lug or ear 108 provided on lever section 62, the other end of the spring being hooked around a sleeve 110 carried on a stub shaft 112 mounted by the support 50.

A cylindrical member 114 preferably of semi-hard rubber surrounds and is preferably bonded to the sleeve 110 and is adapted to be engaged by a curved flange portion 116 formed on the element 78 as shown in FIGURE 2. The member 114 provides a yieldable abutment for cushioning the return movement of the brake actuating element 78 to brake release position.

The engagement of the projections 104 of the lever member 60 with the struck up projections 102 on the brake actuating element 78 provides an interconnection whereby swinging movement of the lever member 60 in a clockwise direction, as viewed in FIGURES 1 and 2, causes clockwise rotation of the brake actuating element 78 to move the latter toward brake-setting position.

The arrangement includes means for retaining the brake actuator element 78 in positions of adjustment resulting from clockwise movement of the brake actuating lever 60. This arrangement is inclusive of a toothed means, sector or ratchet construction 120 and a cooperating pawl 122 carried by the element 78 as shown in FIGURE 2. The toothed sector construction 120, in the embodiment illustrated, comprises a pair of identically shaped members or bars 122 provided with identical ratchet teeth 124. The members 122 are in contiguous or side-by-side relation and are pivotally supported upon a pin 126 mounted by the bracket 50.

It should be noted that the teeth 124 of the ratchet construction 120 are arranged in an arc generated about the axis of the fulcrum of the lever 60 and axis of rotation of element 78. The sections comprising the ratchet construction 120 are formed with abutment surfaces 130 providing a ledge which is engaged by an extremity 132 of a drawbar construction 134 which, in the position illustrated in FIGURE 2, retains the ratchet construction 120 in a position whereby the teeth 124 are engaged by the pawl 122.

A suitable spring means 125 is associated with the pawl 122 for normally urging the latter in a direction to engage the teeth 124 as the brake actuating element 78 is moved in a clockwise direction about its axis of rotation, the pawl 122 engaging the teeth 124 to retain element 78 in brake-setting or adjusted positions. Pivotally supported upon a shaft or pin 136 carried by the bracket 50 is an arm or member 138 preferably formed of sheet metal and illustrated in detail in FIGURE 5.

The arm 138 is fashioned with a transversely extending flange 140 disposed in the path of movement of a curved surface 142 provided by transversely extending flange portions 144 formed on the sections 79 and 80 comprising the rotatable element 78. It should be noted that clockwise rotation of element 78, as viewed in FIGURE 2, engages the surface 142 with the flange 140 of member 138 causing the member 138 to be moved in a clockwise direction about its pivotal support 136.

Figure 3:
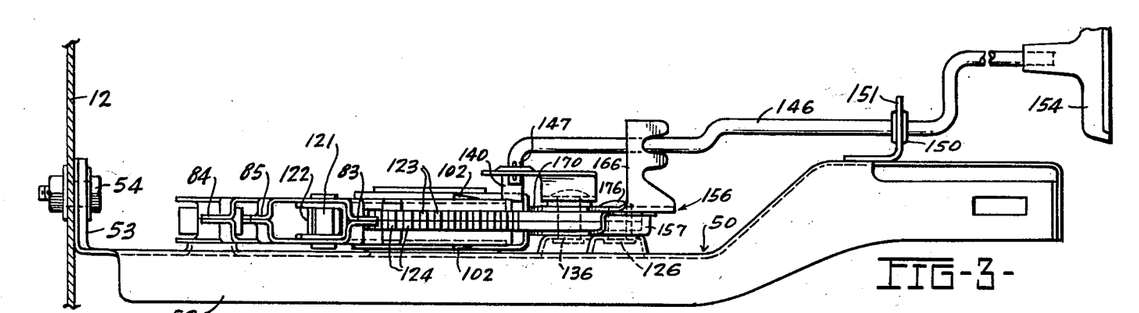
FIGURE 3 is a top plan view of the apparatus illustrated in FIGURE 2.

Pivotally connected with the upper end region of the member 138 is a release means which is inclusive of a rod 146 having a transverse projection 147 extending into an opening in member 138. The rod extends through a grommet 150 carried by a bracket 151 welded or otherwise secured to the support 50 as shown in FIGURES 2 and 3. The rod 146 is equipped with a hand grip or manipulating means 154 to effect longitudinal movement of the rod.

Also pivotally supported upon the pin 126 is an arm or member 156, the arm 156 having secured thereto a bracket 157 provided with an opening to receive the shaft 126 to provide lateral stability for the arm 156. The arm 156 is provided with an opening 158 which receives the end of the drawbar 134 providing an operative connection between member 156 and the drawbar. The arm 156 is provided with a lug 160 to which is secured one end of a contractile coil spring 162, the other end of the spring engaging in an opening 164 in the support 50 biasing the arm 156 for rotation in a counterclockwise direction about the rivet 126 as viewed in FIGURE 2.

The arm 156, as shown in FIGURES 3 and 4, is formed with a transversely extending flange 166 from which depends a bifurcated configuration 167, the furcations straddling the rod 146 providing a guide means for the rod. Journaled upon the stub shaft or rivet 136 is a roller 170, shown in FIGURES 2 and 5, which may be fashioned of semi-hard rubber or any other suitable material. As shown in FIGURES 2, 7, 9 and 10, the pawl member 96 is fashioned with an arm or extension 172 adapted, when the lever 60 is in normal or brake release position to engage the periphery of the roller 170 and retain the pawl member 96 out of the path of movement of the teeth 94 of the members 90.

The members 123 of the ratchet component 120 are formed with projections 176 which, as shown in FIGURE 2, are engaged by the end of the drawbar 134 to limit the movement of the drawbar in a right-hand direction.

The drawbar in this position supports the ratchet component 120 through engagement of the distal portion 132 of the drawbar with the abutment surface 130. The ratchet component in this position is elevated so that the teeth 124 are in the path of movement of the pawl 122 to be engaged thereby during brake-setting operations.

The brake actuating means of the invention provides for a double or multiple stroke of the foot-operated lever or member 60 in order to effectively set the parking brakes particularly in instances where wear of the brake mechanism prevents effective setting of the brakes by a single stroke of the foot-operated lever 60. When the brakes are properly adjusted or are not appreciably worn, a single stroke of the foot-operated lever 60 may be effective to set the brakes, but if not, then the foot-operated lever 60 is arranged for a second stroke to assure an effective setting of the parking brakes.

The operation of the embodiment of the invention illustrated in the drawings is as follows: The brake actuating or controlling apparatus of the invention shown in FIGURES 1 through 10 is in brake release position in FIGURES 1 and 2. In this position the foot-operated actuating lever or member 60 is in its rearmost position, the rotatable actuating member 78 is at its extreme limit of counterclockwise movement as viewed in FIGURE 2 with the portion 116 in engagement with the abutment cushion 114. The pawl 122 journaled on the pin 121 carried by the actuator 78 is forwardly of the ratchet component 120, the drawbar 134 is in a position whereby the portion 132 thereof engages the abutment surface 130 positioning the ratchet component 120 in its uppermost position.

The projections 104 formed on the lever member 60 are in engagement with the struck up abutments 102 formed in the walls of the element 78. The operator, in setting the parking brakes, exerts foot pressure upon the foot pad 68 shown in FIGURE 1 and swings the foot-operated lever 60 forwardly to the broken line position illustrated in FIGURE 1, the other components of the actuating mechanism being in the position shown in FIGURE 7 at the extreme limit of the forward stroke of the lever 60.

During the initial forward stroke of the foot-operated lever 60 the following actions occur: The rotatable brake actuating element 78, through the engagement of projections 104 on the lever with the struck up abutments 102 on member 78 effect rotational movement of element 78 through the same radial angle as that of the lever 60 to the position shown in FIGURE 7. During rotational movement of the member 78 in a clockwise direction about the axis of the supporting sleeves 70 and 71, the cam surface 142 on member 78 in engagement with the portion 140 of the arm 138 moves the arm to the position shown in FIGURE 7.

During movement of the arm 138 in a clockwise direction about its pivotal support 136, the release rod 146 and hand grip 154 are moved longitudinally rearwardly, the relative position of the hand grip 154 being rearwardly of the instrument panel 15 constitutes a visual signal to the operator that the brakes are in a set or partially set condition. If the parking brake shoes are properly adjusted, the parking brakes may be effectively set through the single stroke or partial stroke of the foot-operated lever 60.

Whether the brakes are set or only moved toward a set position, the pawl 122 engages the teeth 124 of the ratchet member 120, holding or retaining the rotatable brake actuating element or component 78 in the position shown in FIGURE 7, which may be a brake set position or a partial brake-setting position. Foot pressure is then released upon the foot pad 68 and the foot-operated lever 60, under the influence of the contractile spring 106, is returned to its initial position shown in FIGURE 9.

Figures 9, 10:
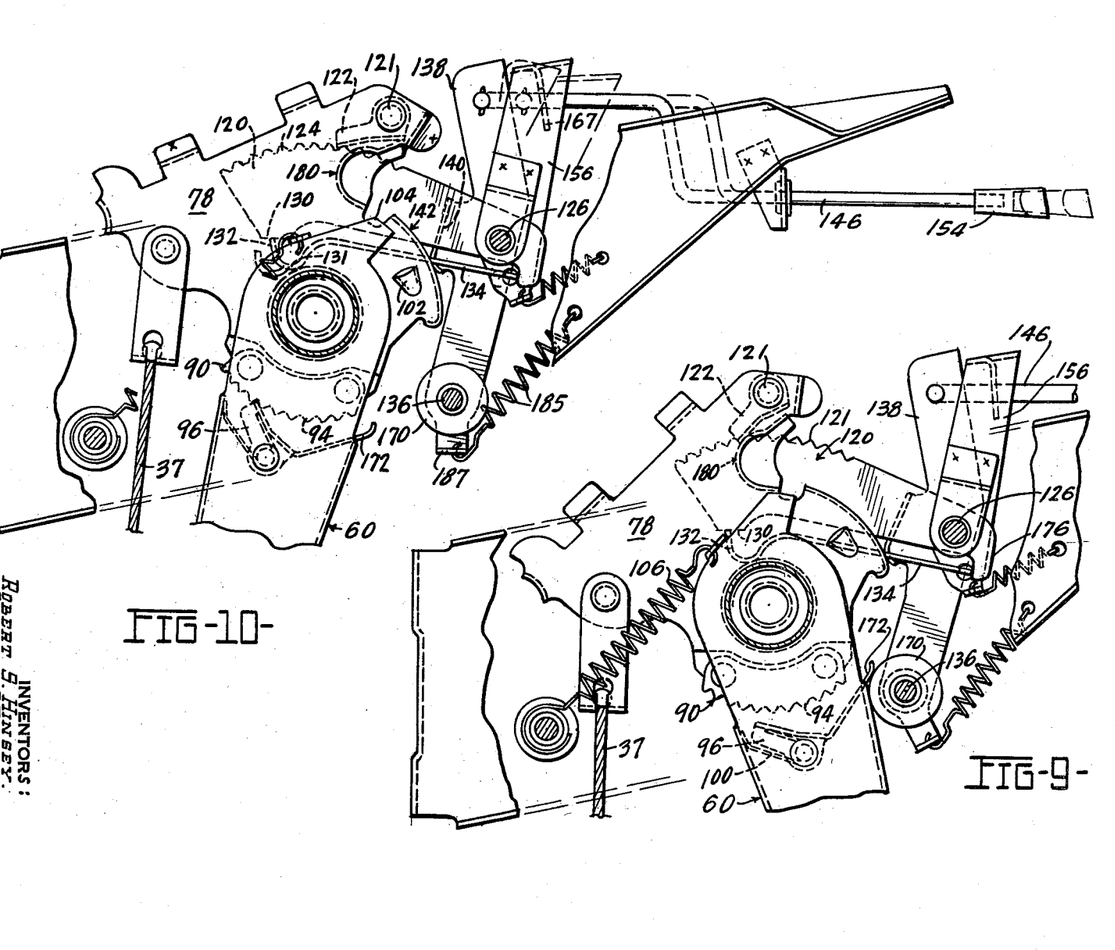
FIGURE 9 is an elevational view illustrating the relationship of the components of the brake actuating mechanism preparatory to a second brake-setting movement of the foot-operated member.
FIGURE 10 is an elevational view of the components of the apparatus in a full brake-setting position just prior to the release of the retaining means.

FIGURE 9 illustrates the position of the components of the brake actuating mechanism after the completion of a first stroke of the lever member 60 and after the return of the lever member 60 to its initial position under the influence of the contractile spring 106. In this position, the extension 172 formed on the pawl 96 engages the periphery of the roller 170 to temporarily move the pawl 96 out of the path of the teeth 94 of the ratchet member or sector 90 carried by the rotatable actuator 78.

In the event that the initial or first stroke or partial stroke of the foot-operated brake actuating lever 60 is effective to set the parking brakes of the vehicle, release of the brakes may be affected by movement of the hand grip member 154 and the rod 146 in a right-hand direction as viewed in FIGURES 9 and 10. Such movement of the rod 146 in a right-hand direction swings the arm 138 in a clockwise direction about its pivotal support 136 engaging the upper end region of arm 138 with the upper region of the arm 156, swinging the latter arm in a clockwise direction.

Movement of the arm 156 in a clockwise direction causes movement of the drawbar 134 in a left-hand direction as viewed in FIGURES 9 and 10, moving the portion 132 of the drawbar out of engagement with the abutment or ledge 130 on the ratchet sector 120, permitting the ratchet sector 120 to fall or swing downwardly about the axis of the stub shaft 126 to effect disengagement of the teeth of the ratchet sector 120 from the pawl 122.

The inwardly extending flange portions 180 formed in the walls of the member 78 are disposed to limit the pivotal movement of the pawl 122 in a counterclockwise direction about its pivotal support 121 preventing the pawl 122 from re-engaging the teeth of sector 120, thus effecting a release of the element 78 which, under the influence of the springs associated with the vehicle brakes through the medium of the cable 37 is returned to brake release position illustrated in FIGURE 2.

In the event that the initial or first stroke of the foot-operated lever 60 toward brake-setting position is ineffective to set the parking brakes of the vehicle, the operator again exerts pressure on the foot pad 68 to swing the lever 60 in a clockwise direction through a second stroke or a fraction thereof sufficient to move the rotatable actuating member 78 through an angle required to fully set the parking brakes of the vehicle.

With particular reference to FIGURES 9 and 10, the following actions occur during the second stroke or partial stroke of the foot-operated lever 60.

At the initial movement of the second stroke of the lever 60 in a clockwise direction as viewed in FIGURE 9, the extension 172 formed on the pawl 96 moves out of contact with the roller 170, the spring 100 biasing the pawl 96 into engagement with the teeth 96 on the ratchet sector 90 carried by the rotatable element 78. With the pawl 96 engaging a tooth in the sector 90, further clockwise movement of the foot-operated lever 60 rotates the element 78 through a further radial angle until the parking brakes are in a set position.

Such a position is illustrated in FIGURE 10. The pawl 122, under the influence of rotative movement of the member 78, is moved along the ratchet teeth 124 and in full brake-setting position, the pawl 122 engages a tooth 124 to hold the brakes in a set position. The operator then releases foot pressure on the pad 68 and the lever member 60, under the influence of the contractile spring 106, is returned to its initial position shown in FIGURE 2, but the other components of the actuating mechanism are retained in the position illustrated in FIGURE 10 by reason of engagement of the pawl 122 with a tooth of the ratchet sector construction 120.

It should be noted that the cam surface 142 formed on member 78 cooperating with the abutment 140 formed on the arm 138 is effective during the first stroke of the foot-operated lever 60 to move the arm 138 to the position shown in FIGURE 9. During the second stroke of the foot-operated lever 60, the arm 138 remains in a substantially static position with the rod 146 and hand grip 154 extended as the curvature of the cam surface 142 is generated about the fulcrum axis of the lever and hence does not effect further relative movement of the arm 138 during the second operative stroke of the foot-operated lever 60.

The initial or first stroke of the lever member 60 is effective to move the release rod 146 and hand grip member 154 outwardly or rearwardly of the instrument panel of the vehicle to the dotted position shown in FIGURE 1, indicating to the operator a visual signal that the parking brake actuating mechanism is not in a brake release position. To effect a release of the brake actuating mechanism from a position where the brakes are in fully set position as illustrated in FIGURE 10, the hand grip member 154 is moved by the operator in a right-hand direction as viewed in FIGURE 10.

This movement imparted to the rod 146 engages the upper end region of arm 138 with the upper region of the arm or member 156, rotating the latter arm about the pivot 126 and moving the drawbar 134 in a left-hand direction to disengage the portion 132 of the drawbar from the ledge or abutment 130 on the ratchet construction 120, permitting the ratchet construction to swing or fall by gravity and the pressure on the pawl 122 in a counter-clockwise direction about its pivot 126 to thereby disengage the ratchet teeth 124 from the pawl 122 whereby the rotatable brake actuator 78 is released to rotate in a counterclockwise direction about its journal support under the influence of the brake springs transmitted through the cable 37 to brake release position illustrated in FIGURE 2.

Prior to release movement of the rod 146, the foot-operated lever 60 is returned to its initial or brake release position by the spring 106 and, as it approaches such position, the extension 172 on the pawl 96 engages the roller 170 to disengage the pawl 96 from the teeth of the ratchet member 90 so that upon release movement of the release rod 146, the pawl 96 and the teeth of the sector 90 are out of engagement so that return rotation of element 78 is unimpeded.

The arm 138 is biased at all times for movement in a counterclockwise direction about its pivot 136 under the influence of a contractile spring 185, one end connected with an ear 187 on the arm 138, and the other end anchored in an opening in the support 50. It should be noted that through the use of a pivotally supported ratchet construction 120 which, in release position, is moved downwardly so that the teeth 124 thereof are out of the path of movement of the pawl 122, there is no liability for the rotatable brake actuator or element 78 to be held in a partially released position and a full return of element 78 to brake release position is assured.

When the operator releases the hand grip 154, the biasing spring 162 exerts a movement on the arm 156 rotating the latter in a counterclockwise direction about its pivotal support 126, such movement withdrawing the drawbar 134 in a right-hand direction as viewed in FIGURES 2 and 10, bringing or camming the portion 132 thereof into engagement with the abutment or ledge 130 on the sector construction 120 to elevate or swing the sector construction 120 to its uppermost position about its pivot 126.

This action moves the ratchet construction 120 in a position whereby upon subsequent rotation of the element 78 to brake actuating position, the pawl 122 will engage the teeth of the ratchet construction 120 to hold member 78 in brake-setting or partial brake-setting position to which it has been moved by one or a second stroke of the foot-operated lever 60.

It should be noted that the region of engagement 131 of portion 132 of the drawbar with the inwardly turned circular flanges 82 of the member 78 is such that the tension of the brake cable 37 transmitted through the pawl 122 and ratchet construction 120 to the portion 132 of the drawbar will not affect the relative position of the drawbar 134 and is movable to sector releasing position only through positive swinging movement of arm 156 through release movement of the rod 146.

This arrangement prevents or avoids any inadvertent release of the sector construction 120 from engagement with the pawl 122. Furthermore the spring 162 exerts a constant bias upon the drawbar 134 to normally retain the same in position supporting the ratchet construction 120 in pawl engaging position. The depending projection 176 on the ratchet construction 120 is engaged by the end of the drawbar 134 connected with the arm 156 to limit the movement of the drawbar in a right-hand direction as viewed in FIGURE 10.

It will be apparent that when the rotatable brake actuator or element 78 is moved to brake-setting position and foot pressure removed from the foot-operated lever 60, the lever is immediately returned to brake release position under the influence of the spring 106.

When the rotatable brake actuator 78 is released for movement to brake release position, it reverts to such position independently of the lever 60 thus resulting in less shock transmitted to the cushion or abutment 114, the lever member 60 being already in a released position and hence unaffected by return rotation of the actuator 78 to brake release position.

Figure 11:
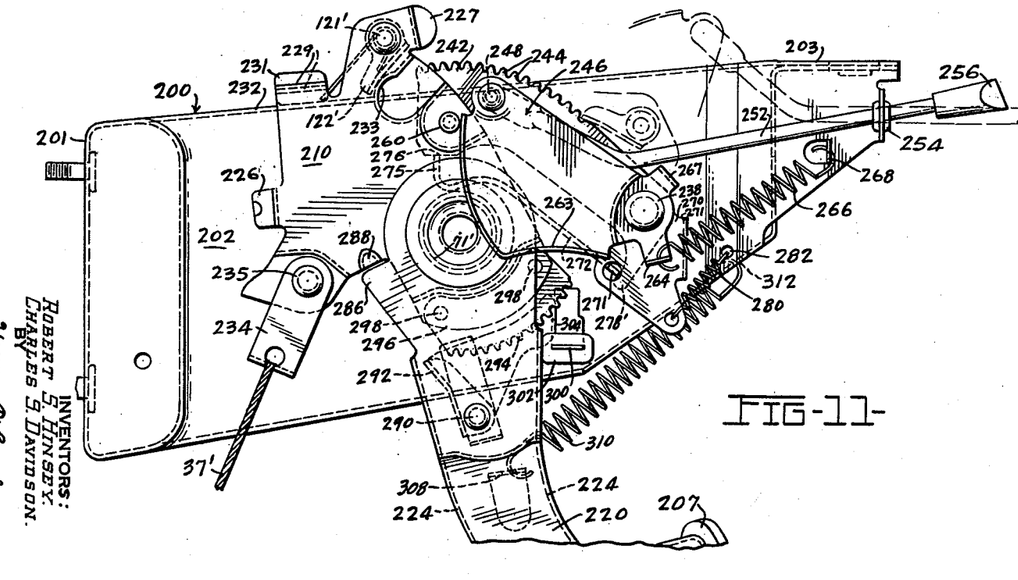
FIGURE 11 is an elevational view similar to FIGURE 2 illustrating a modified form of brake actuating apparatus of the invention.
Figure 12:
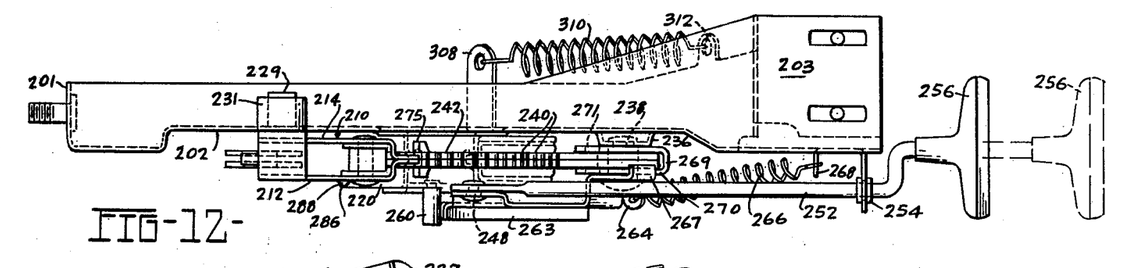
FIGURE 12 is a top plan view of the apparatus shown in FIGURE 11.

FIGURES 11 and 12 illustrate a modified form of mechanism control of the invention. In this form the mechanism control utilized for controlling the parking brakes of a vehicle is mounted upon a support or bracket 200, one end of which is provided with a flange 201 adapted to be secured to the firewall 12 of the vehicle, and the other end connected with the instrument panel 15 through the medium of bolts extending through a flange portion 203 of the support 200. The lever construction 205, which is of foot-operated type, is equipped with a foot pad portion 207 at its lower end, and is fulcrumed upon a sleeve-like construction 70', 71' of the same construction as illustrated in the form of the invention shown in FIGURE 6, the sleeve portion 70' being formed from the planar portion 202 of the bracket or support 200.

Journally supported for rotation upon the sleeve constructions 70' and 71' is a rotatable brake actuating element or component 210 of a construction similar to the element 78 shown in FIGURE 7. The element 210 is fashioned of two mating sections 212 and 214 respectively provided with inwardly extending cylindrical sleeve portions 216 and 218 which are journally supported upon the sleeve portions 70' and 71'.

The lever construction 205 is fashioned of mating sheet metal sections 220 and 222 having inwardly turned flanges 224 which are welded together at their median line of juncture in the same manner as the sections of the lever 60 are joined together. The wall or web portions of the lever sections are formed with openings whereby the lever sections are slidably received upon the sleeve portions 70' and 71' whereby the lever or member 205 is journally supported or fulcrumed for movement about the axis of the sleeve portions 70' and 71'.

The sections 212 and 214 of the rotatable brake actuating element 210 are formed with ear portions 226 and 227 which are welded together. The sections 212 and 214 are fashioned with transversely extending ear portions 229 and provide a support for a bumper or abutment 231 fashioned of semi-hard rubber or other nonmetallic cushioning material. The bumper 231 is adapted to engage an upper flange 232 of the support or bracket 200 to define the brake release position of the rotatable element 210.

The element 210 is connected with a clevis member 234 by means of a clevis pin 235, the upper end of the flexible brake actuating cable 37' being attached to the clevis 234 in the same manner as shown in FIGURE 2. The rotatable brake actuating element 210 is equipped with a pawl 122' pivotally mounted upon a pin 121'. The bracket or support 200 is fashioned with a boss portion 236 mounting a stub shaft or rivet 238 which pivotally supports a pair of matched plates 240 forming a ratchet sector 242, the plates being fashioned with ratchet teeth 244 which are adapted for cooperation with the pawl 122'.

Also pivotally mounted by the stub shaft or rivet 238 is an arm or member 246 provided with a pin or rivet 248 which extends through an opening in a flattened portion 250 of a release rod 252 which extends rearwardly of the support through a grommet 254 of rubber or other nonmetallic material, the distal end of the release rod being provided with a hand grip member 256.

The wall portion 220 of the rotatable element 210 is provided with a transversely extending pin 260 which engages a curved flange portion 262 of the member 246, this arrangement functioning during rotative movement of the element 210 in a clockwise direction toward brake-setting position to engage the curved portion 262 and rotate the member 246 about its pivotal support 238, this action moving the release rod 252 rearwardly relative to the bracket 200. This action moves the hand grip 256 rearwardly of the instrument panel toward the operator and provides a visual signal that the brake mechanism is not in brake release position.

The member 246 is provided with a projection or ear portion 264 to which is attached one end of a contractile coil spring 266, the other end of the spring engaging in an opening in a transversely extending ear portion 268 formed on the support 200. The contractile spring 266 biases the member 246 toward brake release position, viz. the position illustrated in FIGURE 11. Also pivotally supported upon the stub shaft or rivet 238 is an arm or member 270 of generally U-shaped configuration as shown in FIGURE 12.

Pivotally secured to the member 270 is an end of a drawbar or member 272, the distal end of the drawbar being fashioned with a hook-like portion terminating in an upwardly extending projection or abutment 275, the latter being adapted to engage a land, ledge or abutment surface 276 formed on the ratchet construction 242. The plates 240 providing the ratchet construction 242 are fashioned with depending projections 278 engaging the end portion 271 of the drawbar to position the drawbar with respect to the abutment or ledge 276 to support the ratchet sector construction 242 in its uppermost position so that the teeth thereof may be engaged by the pawl 122' during movement of the rotatable element 210 toward brake-setting positions.

One end of a contractile spring 280 is secured to the member 270, the other end of the spring being engaged with the support bracket 200 through an opening 282 shown in FIGURE 11. The contractile spring 280 biases the member 270 in a counterclockwise direction as viewed in FIGURE 11 to maintain one end of the drawbar in engagement with the depending portion 278 and the opposite end 275 in engagement with the surface or land 276 of the ratchet sector 242.

The side walls of the sheet metal sections of the foot-operated lever construction 205 are provided with ledge portions or projections 286 which are adapted for engagement with outwardly struck portions 288 formed on the wall portions 212 and 214 of the rotatable element 210. Thus during the first stroke or movement of the foot-operated lever 205 in a clockwise direction about its fulcrum, the projections 286 on the lever engage the outwardly struck portions 288 to rotate the element 210 about the axis or fulcrum of the lever member.

Secured to the lever construction 205 is a pin or rivet 290 upon which is pivotally supported a second pawl 292 adapted for cooperation with teeth 294 of a toothed sector or ratchet member 296 secured to the rotatable element 210 by means of rivets 298. The function of a pawl 292 is to rotate the element 210 during a second or subsequent operative stroke of the foot-operated lever 205. The bracket 200 is fashioned with a transversely extending ear portion 300 shown in FIGURE 11 equipped with a buffer or bumper 302 of semi-hard rubber or the like which is engaged by the lever member 205 in its initial position as shown in FIGURE 11.

The pawl construction 292 is fashioned with a projection 304 which is adapted, when the foot-operated lever 205 is at brake release position to engage the rubber bumper 302 to bias the pawl 292 out of engagement with the teeth 294 of the ratchet sector 296. The wall portion 222 of the foot-operated lever 205 is formed with a laterally extending ear portion 308. One end of a contractile spring 310 is secured to the portion 308, the other end of the spring 310 being connected with a flange portion of the support bracket 200 as shown at 312.

The contractile spring 310 biases the foot-operated lever 205 in a counterclockwise direction toward its initial position as viewed in FIGURE 11. It should be noted that the curved flange portion 262 of member 246 is joined with a second portion 263 of different curvature.

The curved contours of the portions 262 and 263 are such that during rotation of the element 210 in a clockwise direction the pin 260 engaging the curved surface 262, swings member 246 about its pivotal support 238 to move the release rod 252 rearwardly of the mechanism, the curvature of portion 262 progressively moving the release rod 252 rearwardly. When the pin 260 engages and moves along the curved surface 263, the latter is of such curvature that further rotation of the element 210 does not impart additional movement to the release rod 252 so that the hand grip portion remains extended in a substantially static position during the second stroke of the foot-operated lever 205.

The operation of the mechanism shown in FIGURES 11 and 12 is similar to the operation of the mechanism illustrated in FIGURES 1 through 10. When the operator desires to effect a setting of the parking brake mechanism, foot pressure is exerted upon the foot pad 207 swinging the foot-operated lever 205 in a clockwise direction about its fulcrum as viewed in FIGURE 11. This movement engages projections 286 on the lever 205 with the outwardly struck projections or abutments 288 on the wall portions of the rotatable element 210 to rotate the said element in a clockwise direction about its journal axis or fulcrum of the lever, effecting a brake-setting movement of the flexible cable 37' connected with the parking brakes of the vehicle.

This rotational movement of the element 210 brings the pawl 122' into cooperative engagement with the teeth 244 of the ratchet sector 242 so that when the foot-operated lever 205 is moved to its maximum position during the first stroke, the pawl 122' engages the teeth of the member 242 and retains or holds the rotatable member 210 in the position to which it is moved by the initial stroke of the foot-operated lever 205.

The operator releases pressure on the foot pad 207 and the contractile spring 312 swings the lever 205 to its initial position as shown in FIGURE 11 in engagement with the cushion or buffer 302. Assuming that the initial stroke of the foot-operated lever was insufficient to fully set the parking brakes, the operator again exerts pressure upon the foot pad 207 to swing the lever 205 through a second stroke.

At the initial or starting movement of the second stroke the pawl 292 under spring pressure engages the teeth 294 of the ratchet sector 296 and moves the ratchet sector and the rotatable element 210 in a further clockwise direction exerting further upward movement on the cable 37' to effect a setting of the parking brake mechanism. When the rotatable member 210 is moved to such position, it is retained by engagement of the pawl 122' with the teeth 244 of the ratchet member 242 to hold the brakes in set position.

It should be noted that during movements of the lever 205 and the rotatable brake actuator element 210 toward brake-setting position, the position of the drawbar 272 remains unchanged with the projecting portion 275 thereof engaging the ledge 276 on the ratchet member 242.

When it is desired to release the parking brakes the operator exerts a rearward pull upon the brake release rod 252 through the medium of the hand grip 256, which movement brings the portion 267 of the member 246 into engagement with the bight portion 271 of the arm 270 causing rotation of the arm 270 about the axis of the stub shaft 238.

This movement of the arm 270 exerts a longitudinal movement on the drawbar 272 forwardly to move the projection 275 thereof forwardly of the ledge or abutment surface 276 on the ratchet sector 242 thus permitting the ratchet sector to swing or fall downwardly in a counterclockwise direction about its pivotal support 238. This relative movement of the ratchet member 242 moves the teeth thereof out of engagement with the pawl 122' to release the rotatable member 210 for movement to brake release position under the influence of the brake springs associated with the brake shoes of the vehicle.

The pawl 122' is limited in its downward movement by inwardly embossed portions 233 whereby the pawl 122' is prevented from engagement with the teeth of the ratchet construction 242 until the latter is elevated to its pawl engaging positon through movement of the drawbar 272. Upon release of the hand grip 256 by the operator, the contractile spring 266 returns the arm 246 to its initial position shown in FIGURE 11.

The member or arm 270 is rotated in a counterclockwise direction under the influence of the contractile spring 280 when the portion 267 of member 246 moves away from the bight portion 271 of the member 270 so as to permit or facilitate rotation of the latter to its initial position.

Movement of the member 270 to its initial position moves the drawbar 272 in a right-hand direction as viewed in FIGURE 11, re-engaging the projection 275 on the drawbar with the ledge or abutment 276 on the ratchet construction 242, elevating the ratchet construction 242 about its pivotal support 238 into a position whereby the teeth thereof may be engaged by the pawl 122' during the next or succeeding movements of the rotatable member 210 toward brake-setting position under the influence of a subsequent stroke of the foot-operated lever 205.

It should be noted that after a brake-setting movement of the foot-operated lever 205 and a release of foot pressure upon the pad 207, that the lever is returned to its initial position in engagement with the buffer 302 under the contractile tension of the coil spring 310 whereby the lever member moves to its initial position independently of the position of the rotatable brake actuator element 210.

Thus during release of the rotatable element 210 for return movement toward brake release position, there is no relative movement of the foot operated lever 205. The return movement of the element 210 to brake release position is cushioned by engagement of the rubber buffer or bumper 231 with a flange portion of the support bracket 200.

It is apparent that, within the scope of the invention, modifications and different arrangements may be made other than as herein disclosed, and the present disclosure is illustrative merely, the invention comprehending all variations thereof.

We claim:

1. Mechanism for controlling the parking brakes of a vehicle including, in combination, a relatively stationary support, a foot-operated lever member fulcrumed on said support, an element journaled on the support for rotation about the axis of the lever fulcrum relative to said lever member adapted to be connected to the parking brakes for actuating the brakes, pawl and ratchet members arranged for engagement for retaining said element in brake-setting positions, said pawl member being mounted on said element and said ratchet member being mounted on the support, cooperating means on said lever and said element whereby successive movements of said lever member in one direction about its fulcrum effect successive movements of said element in one direction to set the parking brakes, abutment means for supporting the ratchet member in a position to be engaged by the pawl member, a first arm pivotally mounted by the support, a release rod connected with said first arm, means on said element for moving said first arm and release rod upon relative rotation of said element, spring means biasing said first arm toward one position, a second arm pivotally mounted on the support operatively connected with said ratchet member supporting means, resilient means biasing said second arm toward ratchet member supporting position, resilient means independent of said element normally biasing said lever member toward its initial position, said rod being movable to a position engaging said first arm with said second arm to move said ratchet member supporting abutment means to a position to effect disengagement of said ratchet member from said pawl member to release said element for movement to brake release position.

2. Mechanism for controlling the parking brakes of a vehicle including, in combination, a relatively stationary support, a foot-operated lever member fulcrumed on said support, an element journaled on the support for rotation about the fulcrum of said lever member adapted to be connected to the parking brakes for actuating the brakes, a first pawl and ratchet means arranged for interengagement to retain said element in brake-setting positions, said first pawl means being mounted on said element and said first ratchet means being mounted on said support, a second pawl and ratchet means, said second pawl being pivotally mounted upon the foot-operated lever member, said second ratchet means being mounted by said rotatable element, resilient means normally biasing the foot-operated lever member toward brake release position, drawbar means engageable with the first ratchet means for supporting the same in the path of movement of the first pawl means, an arm pivotally mounted by the support having operative connection with the supporting means for the first ratchet means, a release member, cam means connected with the release member and actuated by movement of the rotatable element for shifting the position of the release member during rotation of said element toward brake-setting positions, said release member being manually movable to actuate the first ratchet supporting drawbar means to a position to release the first ratchet means from engagement with the first pawl means whereby said rotatable element is released for movement to brake release position.

3. Mechanism for controlling the parking brakes of a vehicle including, in combination, a relatively stationary support, a foot-operated lever member fulcrumed on said support, an element journaled for rotation relative to said lever member adapted to be connected to the parking brakes for actuating the brakes, a first pawl and ratchet means arranged for interengagement to retain said element in brake-setting positions, said first pawl means being mounted on said element and said first ratchet means being mounted on said support, a second pawl and ratchet means, said second pawl being pivotally mounted upon the foot-operated lever member, said second ratchet means being mounted on said rotatable element, resilient means normally biasing the foot-operated lever member toward brake release position, a drawbar engageable with the first ratchet means for maintaining the same in the path of movement of the first pawl means, an arm pivotally mounted by the support having operative connection with the drawbar, a release means, cam means connected with the release means and actuated by movement of the rotatable element for shifting the position of the release means during rotation of said element toward brake-setting positions, said release means being manually movable to actuate the drawbar to effect disengagement of the first ratchet means from the first pawl means to release the rotatable element for movement to brake release position.

4. Mechanism for controlling the parking brakes of a vehicle including, in combination, a relatively stationary support, a cylindrical sleeve means mounted by the support, a foot-operated lever member fulcrumed by said sleeve means, an element journaled on said sleeve means for rotation relative to said lever member adapted to be connected to the parking brakes for actuating the brakes, pawl and ratchet members arranged for engagement for retaining said element in brake-setting positions, said pawl member being mounted on said element and said ratchet member being mounted on the support, cooperating means on said lever and said element whereby successive movements of said lever member in one direction about its fulcrum effect successive movements of said element in one direction to set the parking brakes, drawbar means for supporting the ratchet member in a position to be engaged by the pawl member, a pivotally supported arm, a release rod adapted for relative movement to actuate said arm, and means establishing operative connection between said arm and the drawbar whereby movement of the release rod actuates the drawbar means to effect disengagement of the pawl and ratchet members to release the element for rotational movement to brake release position.

5. Mechanism for controlling the parking brakes of a vehicle including, in combination, a relatively stationary support provided with a cylindrical sleeve portion, a second sleeve portion secured to the first sleeve portion, a foot-operated lever member fulcrumed by said sleeve portions, an element journaled for rotation on said sleeve portions adapted to be connected to the parking brakes for actuating the brakes, cooperating pawl and ratchet members for retaining said element in brake-setting positions, said pawl member being mounted on said element and said ratchet member being mounted on the support, cooperating means on said lever member and said element whereby a first movement of said lever member in one direction about its fulcrum effects movement of said element in a brake-setting direction, drawbar means for maintaining the first ratchet member in a position to be engaged by the first pawl member, a second pawl pivotally mounted on the lever member, a second ratchet means mounted on said element and cooperating with said second pawl for establishing operative connection between the lever member and the element whereby a second movement of the lever member in one direction effects further rotational movement of the element in a brake-setting direction, a release rod, and means connected with the drawbar means and actuable by the release rod whereby movement of the release rod whereby movement of the release rod actuates said drawbar means to effect disengagement of the first pawl and ratchet means to release the rotatable element for movement to brake release position.

6. Mechanism for controlling the parking brakes of a vehicle including, in combination, a relatively stationary support, a cylindrical sleeve means mounted by the support, a foot-operated lever member fulcrumed by said sleeve means, an element journaled on said sleeve means for rotation relative to said lever member adapted to be connected to the parking brakes for actuating the brakes, first pawl and ratchet members arranged for engagement for retaining said element in brake-setting positions, said first pawl member being mounted on said element and said first ratchet member being mounted on the support, cooperating abutment means on said lever and said element whereby initial movement of said lever member in one direction about its fulcrum effects a rotative movement of said element in one direction, drawbar means for biasing the first ratchet member to a position to be engaged by the first pawl member, a second pawl pivotally mounted on the lever member, a second ratchet means mounted on said element and cooperating with said second pawl for establishing operative connection between the lever member and the element whereby a second movement of the lever member in one direction effects further rotational movement of the element in a brake-setting direction, a pivotally supported arm connected with the drawbar means, a release rod adapted for relative movement, and means connected with the release rod and adapted to engage said arm whereby movement of the release rod actuates the drawbar means to effect disengagement of the first pawl and ratchet means to release the rotatable element for movement to brake release position.

References Cited by the Examiner
UNITED STATES PATENTS

| | | | |
|---|---|---|---|
| 738,100 | 9/03 | Cuntz | 74—529 X |
| 2,507,997 | 5/50 | Roedding et al. | 74—522 X |
| 2,905,024 | 9/59 | McCarthy et al. | 74—529 X |
| 2,908,185 | 10/59 | Koskela | 74—539 X |
| 2,978,926 | 4/61 | Hinsey | 74—539 X |
| 3,002,394 | 10/61 | Spitz | 74—542 X |

BROUGHTON G. DURHAM, *Primary Examiner.*

SAMUEL SPINTMAN, *Examiner.*